United States Patent
Mukherjee et al.

(10) Patent No.: US 12,188,446 B2
(45) Date of Patent: Jan. 7, 2025

(54) METHOD FOR MANUFACTURING A WIND TURBINE BLADE USING AN AIR HEATING ASSEMBLY

(71) Applicants: LM Wind Power A/S, Kolding (DK); LM Wind Power R&D (Holland) B.V., Heerhugowaard (NL); Blade Dynamics Limited, Eastleigh (GB)

(72) Inventors: Manish Mukherjee, Eastleigh (GB); Jeppe Wendelboe, Kolding (DK); Lazlo Bartha, Heerhugowaard (NL)

(73) Assignees: LM WIND POWER A/S, Kolding (DK); LM Wind Power R&D (Holland) B.V., Heerhugowaard (NL); Blade Dynamics Limited, Eastleigh (GB)

( * ) Notice: Subject to any disclaimer, the term of this patent is extended or adjusted under 35 U.S.C. 154(b) by 141 days.

(21) Appl. No.: 17/802,265

(22) PCT Filed: Apr. 12, 2021

(86) PCT No.: PCT/EP2021/059413
§ 371 (c)(1),
(2) Date: Aug. 25, 2022

(87) PCT Pub. No.: WO2021/209374
PCT Pub. Date: Oct. 21, 2021

(65) Prior Publication Data
US 2023/0078908 A1 Mar. 16, 2023

(30) Foreign Application Priority Data
Apr. 15, 2020 (GB) ...................................... 2005482

(51) Int. Cl.
*B29C 35/02* (2006.01)
*B29C 35/04* (2006.01)
(Continued)

(52) U.S. Cl.
CPC ........ *F03D 1/0675* (2013.01); *B29C 35/0266* (2013.01); *B29C 35/045* (2013.01);
(Continued)

(58) Field of Classification Search
CPC . F03D 1/0675; B29C 35/0266; B29C 35/045; B29C 65/10; B29C 65/4835;
(Continued)

(56) References Cited

U.S. PATENT DOCUMENTS

2013/0127081 A1* 5/2013 Giraud .................... B29C 73/34
264/36.1
2015/0056081 A1* 2/2015 De Waal Malefijt ........................
B29C 65/7847
156/500

(Continued)

FOREIGN PATENT DOCUMENTS

DE 102016100641 A1 * 7/2017
WO 2014170232 A1 10/2014
(Continued)

*Primary Examiner* — Daniel McNally
(74) *Attorney, Agent, or Firm* — Nath, Goldberg & Meyer; Jerald L. Meyer; Tanya E. Harkins

(57) ABSTRACT

A method for manufacturing a blade shell part of a wind turbine blade includes providing a mould for manufacturing a blade shell part of the wind turbine blade. The mould has a first moulding side with a first moulding surface that defines an outer shape of the blade shell part. The method comprises providing a blade shell part on the first moulding surface and providing a support element and attaching the support element to a fastening section of the blade shell part. Attaching the support element includes applying adhesive between the support element and the fastening part. The method also includes providing an air heating assembly having a cover extending in a longitudinal direction between a first cover end and a second cover end and extending in a
(Continued)

transverse direction between a primary cover end and a secondary cover end, the cover defining a cavity.

23 Claims, 6 Drawing Sheets

(51) Int. Cl.
| | |
|---|---|
| B29C 65/00 | (2006.01) |
| B29C 65/10 | (2006.01) |
| B29C 65/48 | (2006.01) |
| F03D 1/06 | (2006.01) |
| B29L 31/08 | (2006.01) |

(52) U.S. Cl.
CPC .......... *B29C 65/10* (2013.01); *B29C 65/4835* (2013.01); *B29C 66/1122* (2013.01); *B29C 66/532* (2013.01); *B29C 66/545* (2013.01); *B29C 66/61* (2013.01); *B29C 66/71* (2013.01); *B29C 66/7212* (2013.01); *B29C 66/919* (2013.01); *B29C 66/949* (2013.01); *B29L 2031/085* (2013.01)

(58) Field of Classification Search
CPC . B29C 66/1122; B29C 66/532; B29C 66/545; B29L 2031/085
See application file for complete search history.

(56) References Cited

U.S. PATENT DOCUMENTS

2018/0142670 A1* 5/2018 Garm .................... F03D 1/0675
2019/0358911 A1* 11/2019 Hedges ................. B29C 66/131

FOREIGN PATENT DOCUMENTS

| WO | 2018130257 A1 | 7/2018 |
| WO | 2019241371 A1 | 12/2019 |

* cited by examiner

METHOD FOR MANUFACTURING A WIND TURBINE BLADE USING AN AIR HEATING ASSEMBLY

This is a National Phase Application filed under 35 U.S.C. 371 as a national stage of PCT/EP2021/059413, filed Apr. 12, 2021, an application claiming the benefit of Great Britain Application No. 2005482.1, filed Apr. 15, 2020, the content of each of which is hereby incorporated by reference in its entirety.

FIELD OF INVENTION

The present disclosure relates to acceleration of adhesive curing, such as curing of an adhesive for attaching a blade component or a support element to a wind turbine blade.

BACKGROUND

Wind turbine blades of fibre-reinforced polymer and in particular the aerodynamic shells of wind turbine blades are usually manufactured in moulds, where the pressure side and the suction side of the blade are manufactured separately by arranging glass fibre mats and/or other fibre-reinforcement material, such as carbon fibre, in each of the two moulds. Afterwards, one of the two halves is turned upside down and positioned on top of the other of the two halves, and the two halves are adhered together. The blade parts may be positioned on top of each other by turning and repositioning the complete half mould.

A wind turbine blade may be manufactured by infusing fibres, such as glass fibre mats and/or carbon fibre mats with a resin, such as polyester or epoxy. Infusion of the fibres may be provided by vacuum assisted resin transfer moulding (VARTM).

As wind turbines and wind turbine blades increase in size, the blade loads, i.e. strains, bending moments, peel loads etc., in particular along the trailing edge, increase. For this and other reasons, the design of the trailing edge is an important factor for the efficiency of the wind turbine. Wind turbine blades comprising a flatback profile at the trailing edge may have an increased efficiency. An optimized profile comprises a varying geometry of the trailing edge along the airfoil region of the blade.

However, it may be complicated to assemble a wind turbine blade with a flatback trailing edge. In particular, it may be challenging to sufficiently bond together trailing edge interfaces between the pressure side and suction side blade shell when the blade comprises a flatback profile.

The bond lines may form weak points in the wind turbine blade structure where the airfoil transitions to the flatback trailing edge. In this transition area a support element, such as a flange, may be attached to provide a stronger bond between the two blade shell parts. In addition, the geometry of the flatback wind turbine blade may require additional support elements for supporting the structure of the blade, such as additional webs, spar boxes and flanges compared with the conventional wind turbine blades. These additional support structures attached to the inner surface of the blade shell parts with adhesive requires curing, which in turn increases the in-mould manufacturing time of a wind turbine blade. Furthermore, the support elements required in a flatback wind turbine blade are typically arranged on surfaces with an inclination and their positions may thus need to be fixed before closure of the two shell parts. The time it takes for adhesive to cure with conventional methods may be 3 hours, which may be considered waiting time, where the blade shell part takes up the mould.

Thus, the present disclosure relates to a method to accelerate the curing of the adhesive for attaching support elements to reduce the in-mould manufacturing time of a blade shell part and thus the total manufacturing time of a wind turbine blade.

SUMMARY OF THE INVENTION

It is an object of the present disclosure to provide a method and a system to accelerate the curing time of adhesives for support elements in a wind turbine blade which overcomes at least some of the disadvantages of the prior art.

Thus, the present invention relates to a method for manufacturing a blade shell part of a wind turbine blade. The blade shell part may be a first blade shell part or a second blade shell part, such as a suction side shell part or a pressure side shell part, such as a wind turbine blade comprising a flatback trailing edge. The method comprises providing a mould for manufacturing a blade shell part of the wind turbine blade, such as a suction side shell part. The mould has a first moulding side with a first moulding surface that defines an outer shape of the blade shell part.

A blade shell part may be provided on the first moulding surface. The blade shell part may be a first blade shell part or a second blade shell part, such as a pressure side or a suction side blade shell part. The blade shell part may comprise a trailing edge formed as a flatback.

A support element may be provided. The support element may be a trailing edge flange, such as a flatback trailing edge flange. The support element may be a web, such as a shear web.

The support element may be attached to a fastening section of the blade shell part. The fastening section of the blade shell part may be proximate the trailing edge of the wind turbine blade. The fastening section may be proximate the glue line of the trailing edge of the blade shell part. The fastening section may extend in a direction parallel to the longitudinal direction of the wind turbine blade. Attaching the support element may comprise applying adhesive between the support element and the fastening part. The adhesive applied between the support element and the blade shell part may be made of vinyl ester.

The support element may be fixated to the blade shell part with a clamping tool after attaching the support element to the blade shell part. The clamping tool may fixate the support element in a desired position until the adhesive is cured. The clamping tool may be removably attached to the mould.

An air heating assembly may be provided. The air heating assembly may comprise a cover extending in a longitudinal direction between a first cover end and a second cover end and extending in a transverse direction between a primary cover end and a secondary cover end. The longitudinal direction of the cover may be parallel to the longitudinal direction of the wind turbine blade. The cover may define a cavity. The cover may comprise a primary cover attachment section extending along the primary cover end. The cover may comprise a secondary cover attachment section extending along the secondary cover end. The cover may have length of at least 5 m, such as 10 m, such as 15 m. The cover may have a length corresponding to at least the length of the support element.

The cover may have a shape of, or can be formed into the shape of, a tent, a trough, a bellow or the like. The cover may be self-supporting. The cover of the air heating assembly may comprise an insulating material, such as aluminium, such as aluminium foil.

The cover may be attached to the blade shell part. In a preferred embodiment the cover may be attached such that at least the fastening section is enclosed by the cover. Alternatively, the cover may be attached to the blade shell part and the mould. Attaching the cover to the blade shell part may comprise attaching the primary cover attachment section to a first blade shell attachment section of the blade shell part. Additionally, attaching the cover to the blade shell part may comprise attaching the secondary cover attachment section to a second blade shell attachment section of the blade shell part. Attaching the cover to the mould may comprise attaching the secondary cover attachment section to a mould attachment section of the mould.

The cavity defined by the cover may have a size, such that at least the fastening section may be confined inside the cover. The cover may have a height such that the support element may be enclosed by the cover. The cavity defined by the cover may be large enough to enclose the fastening section and/or the support element and/or the clamping tool. The cavity of the cover may be as large as necessary to confine the fastening section and/or the support element and/or the clamping tool while being as small as possible to reduces the energy needed to heat the cavity.

The mould attachment section of the mould may be located on the mould flange of the mould. Alternatively, the mould attachment section may be located on a non-moulding side of the mould. The mould attachment section may be located on the non-moulding side proximal to the mould flange, e.g., on the upper half on the non-moulding side of the mould. The mould attachment section may extend along the non-moulding side from the edge formed by the non-moulding side and the mould flange.

The primary cover attachment section and/or the secondary cover attachment section and the first blade shell attachment section and/or the second blade shell attachment section may comprise hook and loop fasteners, such as Velcro®. Attaching the cover to the blade shell part may comprise attaching the primary and/or secondary cover attachment section to the first and/or second blade shell attachment part by means of an adhesive, such as glue or tape. Attaching the cover to the mould may comprise attaching the secondary cover attachment section to the mould by means of an adhesive, such as glue or tape.

The primary cover attachment section and the first blade shell attachment section may form a seal, e.g., an airtight seal. The secondary cover attachment section and the second blade shell attachment section may form a seal, e.g., an airtight seal. An advantage of forming a seal is that the air from the air heater can provide air through the entire cavity of the cover. Especially, in the case where the cover is long, e.g., corresponding to at least the length of a support element, e.g. a flatback trailing edge flange, it is important that that the heated air reaches all the way through the cavity and to the second cover end.

Alternatively, the primary cover attachment section and/or the secondary cover attachment section and the first blade shell attachment section and or the second blade shell attachment section may comprise a plurality of sections spaced apart. Each of the sections of the primary cover attachment section may be attached to a corresponding section of the first blade shell attachment section, and each of the sections of the secondary cover attachment section may be attached to a corresponding section of the second blade shell attachment section.

The cover may be removably attached to the blade shell part and/or the mould. For example, the primary cover attachment section may be removably attached to the first blade shell attachment section, the secondary cover attachment section may be removably attached to the second blade shell attachment section, the secondary cover attachment section may be removably attached to the mould attachment section. Alternatively, the cover may be fixedly attached to the mould, e.g. the secondary cover attachment section may be fixedly attached to the mould attachment section.

The air heating assembly may comprise an air heater configured to provide heat. The air heater may emit hot air, such as air with a temperature of between 50-80 degrees Celsius, such as between 60-75 degrees Celsius. Heat, such as heated air, may be provided into the cavity by the air heater.

The air heating assembly may comprise a tube comprising a first tube end and a second tube end. The tube may be connected to the air heater at the first tube end. The tube may be connected to a first opening of the cover at the second tube end. The connection at the first tube end and/or the second tube end may be airtight.

The tube may have a length such that the air heater may be located at a safe distance from the adhesive and the fumes emitted by the adhesive when heated. For example, the tube may extend in the longitudinal direction at least 5 m, such as 8 m, such as 10 m. The tube may be flexible.

Heat may be provided for a first predetermined time. For example, heat may be provided for 5-20 minutes, e.g. 10-15 minutes. For example, heat may be provided until the temperature inside the cover stabilizes at around 60 degrees Celsius.

Heat may be provided for a second predetermined time. For example, when the temperature is stable, heat may be provided for a second predetermined time. For example, heat may be provided for 25-35 minutes, e.g. around 30 minutes. For example, heat may be provided until the adhesive reaches a Shore D hardness of 50. Heat may be provided between 30-50 min, such as between 35-45 min, such as around 45 minutes, for the adhesive to cure.

The second cover end may comprise a second opening. The heated air may be recirculated from the second opening back to the air heater. For example, heat may be recirculated during the first predetermined period of time and/or the second period of predetermined period of time.

The air heating assembly may be removed. The air heating assembly may be removed after the adhesive has cured. The air heating assembly may be removed before two blade shell parts are closed together to form a wind turbine blade. The air heating assembly may be reused to manufacture another blade shell part of a wind turbine blade.

It is an advantage of the present disclosure that the time for curing an adhesive is reduced and thus reducing the total manufacturing time for a wind turbine blade. In particular, wind turbine blades with a flatback trailing edge require more support elements than a conventional wind turbine blade and with the present disclosure, the manufacturing time of a flatback wind turbine blade may be reduced with 2-3 hours. It is a further advantage of the present disclosure that the heat loss of the air heating assembly is reduced by recirculating the heated air and by using a heat insulated cover.

It is envisaged that any embodiments or elements as described in connection with any one aspect may be used with any other aspect or embodiment, mutatis mutandis.

BRIEF DESCRIPTION OF THE FIGURES

Embodiments of the invention will be described in more detail in the following with regard to the accompanying figures. Like reference numerals refer to like elements throughout. Like elements may, thus, not be described in detail with respect to the description of each figure. The figures show one way of implementing the present invention and are not to be construed as being limiting to other possible embodiments falling within the scope of the attached claim set. In addition, an illustrated embodiment needs not have all the aspects or advantages shown. An aspect or an advantage described in conjunction with a particular embodiment is not necessarily limited to that embodiment and can be practiced in any other embodiment even if not so illustrated, or if not so explicitly described.

DETAILED DESCRIPTION

In the following figure description, the same reference numbers refer to the same elements and may thus not be described in relation to all figures.

Figure 1:
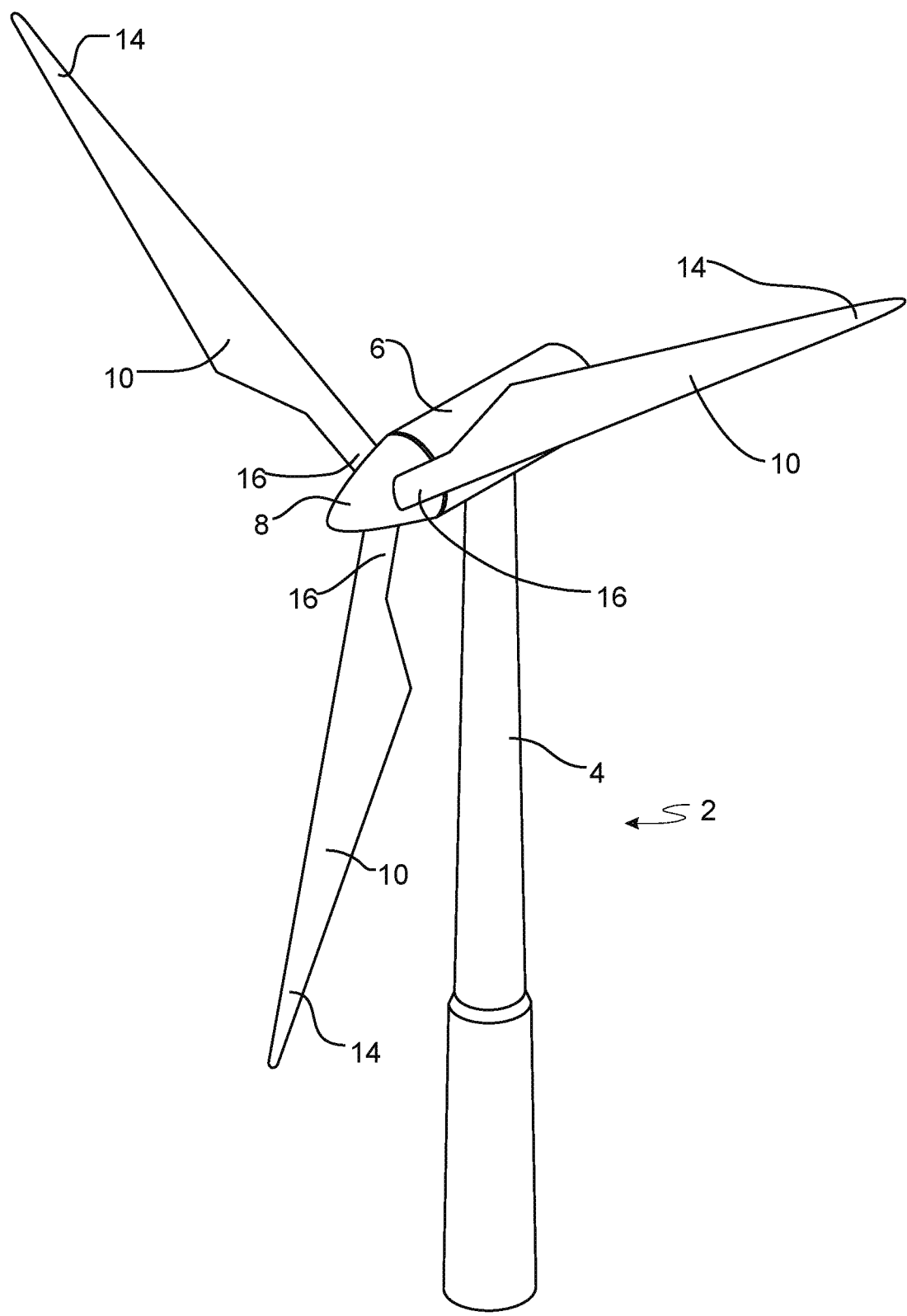
FIG. 1 is a schematic diagram illustrating an exemplary wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8.

Figure 2:
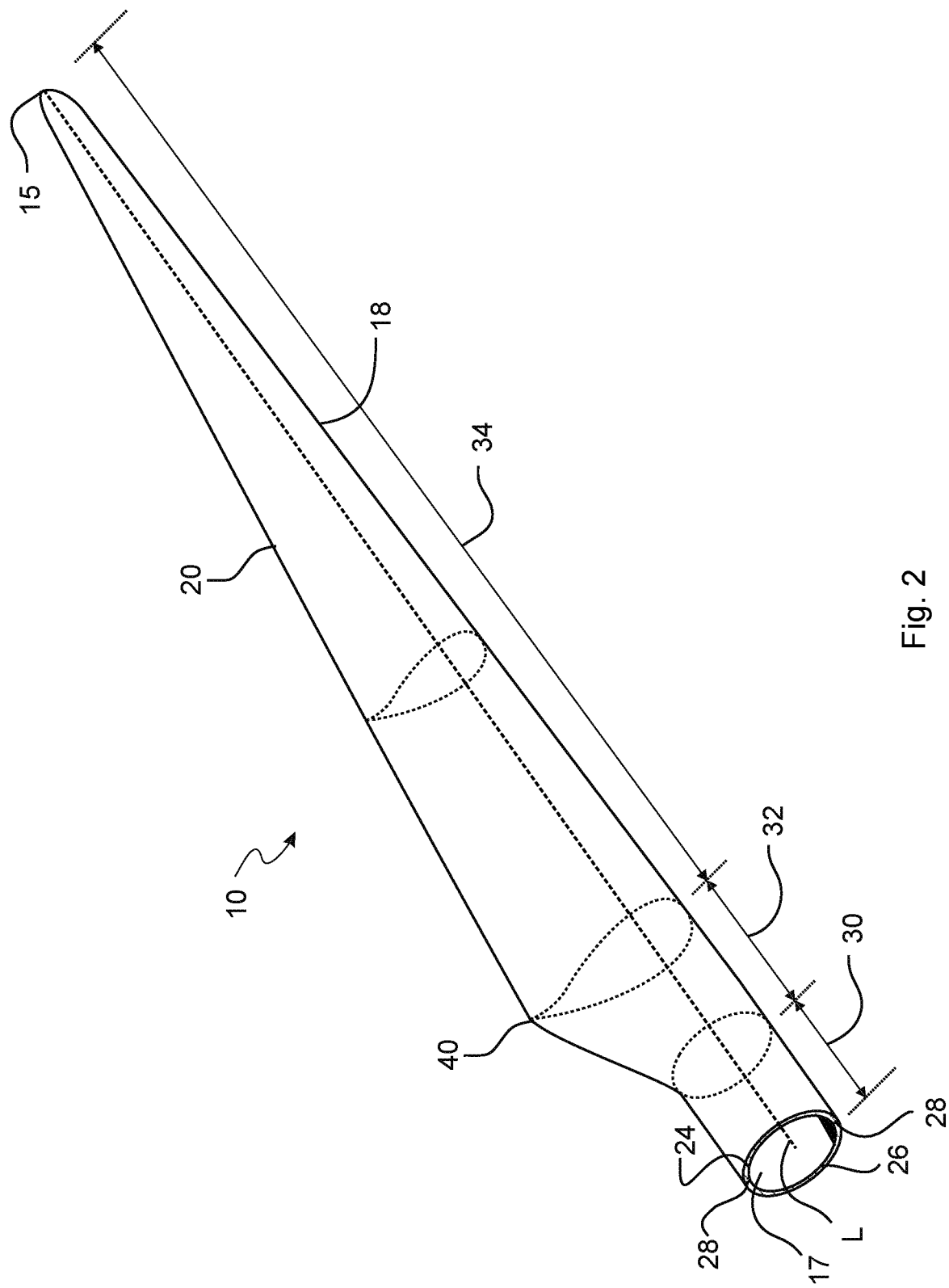
FIG. 2 is a schematic diagram illustrating an exemplary wind turbine blade.

FIG. 2 shows a schematic view of an exemplary wind turbine blade 10. The wind turbine blade 10 has the shape of a conventional wind turbine blade with a root end 17 and a tip end 15 and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 comprises a blade shell comprising two blade shell parts or half shells, a first blade shell part 24 and a second blade shell part 26, typically made of fibre-reinforced polymer. The wind turbine blade 10 may comprise additional shell parts, such as a third shell part and/or a fourth shell part. The first blade shell part 24 is typically a pressure side or upwind blade shell part. The second blade shell part 26 is typically a suction side or downwind blade shell part.

The first blade shell part 24 and the second blade shell part 26 are fastened together with adhesive, such as glue, along bond lines or glue joints 28 extending along the trailing edge 20 and the leading edge 18 of the blade 10. Typically, the root ends of the blade shell parts 24, 26 have a semi-circular or semi-oval outer cross-sectional shape.

Figure 3:
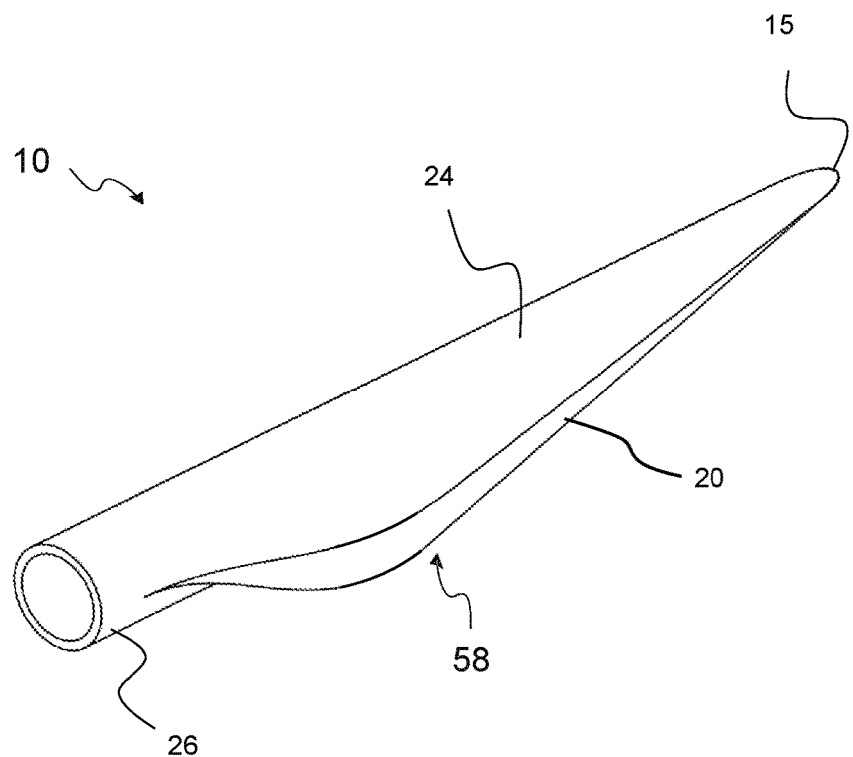
FIG. 3 is a schematic diagram illustrating an exemplary wind turbine blade.

FIG. 3 shows a wind turbine blade 10 with a flatback profile at the trailing edge 20. The trailing edge 20 has a flattened profile. The flattened profile may increase the aerodynamic efficiency and also may reduce the chord width, thereby making it easier to transport the wind turbine blade 10. Furthermore, it also may reduce required manufacturing space.

Figure 4:
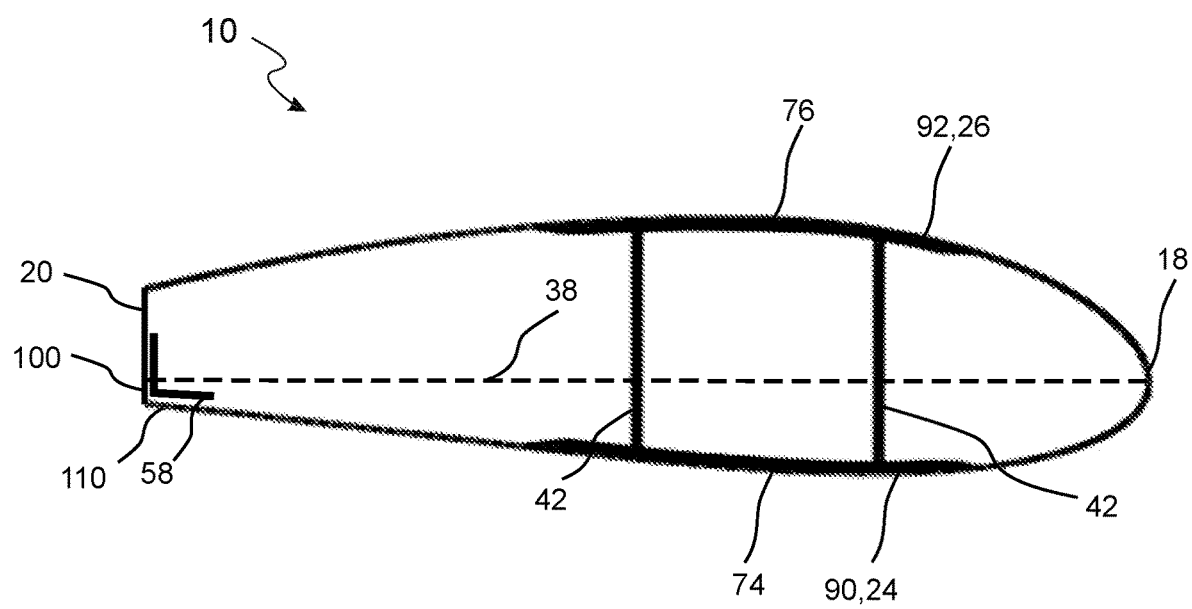
FIG. 4 is a schematic diagram illustrating an exemplary wind turbine blade.

FIG. 4 is a schematic diagram illustrating a cross sectional view of an exemplary wind turbine blade 10, e.g. a cross sectional view of the airfoil region of the wind turbine blade 10 as described in relation to FIG. 3. The wind turbine blade 10 comprises a leading edge 18, a trailing edge 20, a pressure side 24, a suction side 26 a first spar cap 74, and a second spar cap 76. The trailing edge 20 has a flattened profile for forming a flatback profile. The wind turbine blade 10 comprises a chord line 38 between the leading edge 18 and the trailing edge 20. The wind turbine blade 10 comprises shear webs 42, such as a leading edge shear web and a trailing edge shear web. The shear webs 42 could alternatively be a spar box with spar sides, such as a trailing edge spar side and a leading edge spar side. The spar caps 74, 76 may comprise carbon fibres, e.g. in combination with glass fibres, while the rest of the shell parts 24, 26 may comprise glass fibres.

The wind turbine blade 10, such as the shell parts 24, 26 may comprise sandwich panels, e.g. comprising lightweight materials such as balsa or foam sandwiched between fibre-reinforced layers. The trailing edge 20 forming the flattened profile may be provided as a third shell part, or as an integral part of the first shell part 24 or the second shell part 26. Alternatively, the trailing edge 20 may be provided by parts of both the first shell part 24 and the second shell part 26.

A glue joint for assembling the first shell part 24 and the second shell part 26 may be provided near the trailing edge 20, such as between a first trailing edge part of the trailing edge 20 and a second trailing edge part of the trailing edge 20. Alternatively, the glue flange may be provided between the trailing edge 20 and the first shell part 24 or between the trailing edge 20 and the second shell part 26.

In the example described with respect to the following figures, a glue joint between the trailing edge 20 (forming part of the second shell part 26) and the first shell part 24 is described. The first shell part 24 constitutes a first blade component 90 and the second shell part 26 constitutes a second blade component 92 including the trailing edge 20. The first blade component 90 comprises a first contact area 100 configured to be connected to a second contact area 110 of the second blade component 92. The second contact area 110 may form part of the trailing edge 20. In an alternative, non-illustrated, example, the first contact area 100 forms part of the trailing edge 20.

Wind turbine blades are usually manufactured in moulds, where the pressure side and the suction side of the blade are manufactured separately in each of the two moulds. Afterwards, one of the two halves is turned upside down and positioned on top of the other of the two halves, and the two halves are adhered together. The blade parts may be positioned on top of each other by turning and repositioning the complete half mould.

Figure 5A:
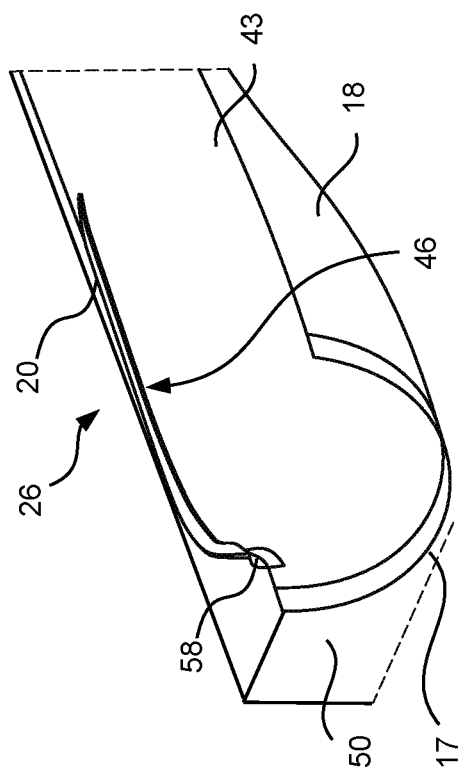
FIG. 5a-5b are schematic diagrams illustrating an exemplary blade shell part.
Figure 6A:
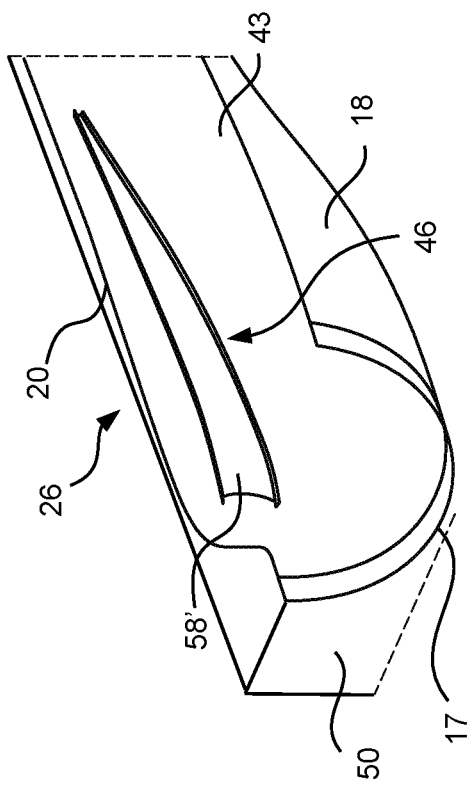
FIG. 6a-6b are schematic diagrams illustrating an exemplary blade shell part.

FIGS. 5a and 6a are schematic diagrams illustrating an exemplary blade shell part, such as the second blade shell part 26 of FIGS. 2-4 in a mould 50 for manufacturing a blade shell part. The blade shell part 26 comprises a root end 17 and a tip end (not shown), a leading edge 18 and a trailing edge 20, e.g. a flatback trailing edge. The blade shell part 26 comprises a support element 58, 58'. The support element 58 of FIG. 5a is a flatback trailing edge flange and the support element 58' of FIG. 6a is a web, such as a shear web. The support element 58, 58' may be attached to a fastening section 46 on the inner surface 43 of the blade shell part 26. The support element 58, 58' may be attached to the fastening section 46 with adhesive.

Figure 5B:
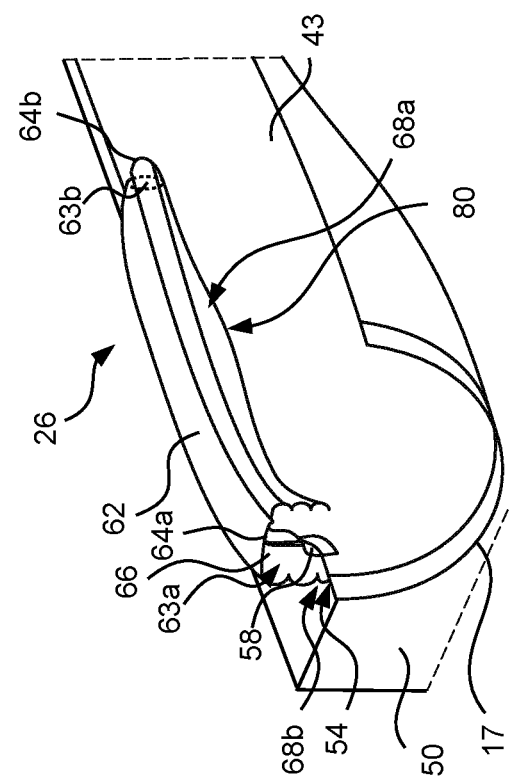
Figure 6B:
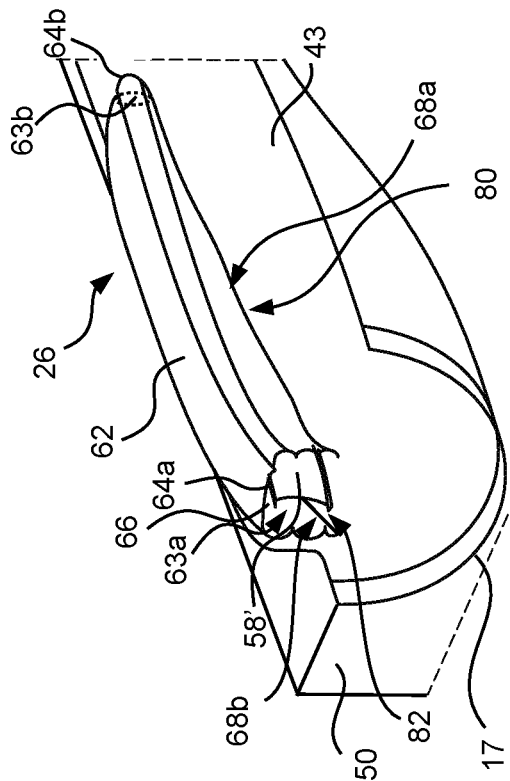

FIGS. 5b and 6b are schematic diagrams illustrating an exemplary blade shell part, such as the blade shell part 26 of the previous figures, with a cover 62. The cover 62 extends in a longitudinal direction between a first cover end 64a and a second cover end 64b and extends in a transverse direction between a primary cover end 65a and a secondary cover end 65b. The cover 62 comprises a first opening 63a at the first cover end 64a and a second opening 63b at the second cover end 64b. The cover 62 defines a cavity 66 in which the support element 58, 58' may be located. The cover 62 may be attached to the blade shell part 26, such as the inner surface 43 of the blade shell part 26. For example, a primary cover attachment section 68a extending along a primary cover end 65a of the cover 62 may be attached to a first blade shell attachment section 80 of the blade shell part 26. A secondary cover attachment section 68b extending along the secondary cover end 65b may be attached to the mould attachment section 54 of the mould 50 as in FIG. 5b. Or the secondary cover attachment section 68b may be attached to the second blade shell attachment section 82 of the blade shell part 26 as in FIG. 6b. The primary cover attachment section 68a and the first blade shell attachment section 80 may comprise hook and loop fasteners, such as Velcro®. Alternatively, an adhesive, such as a non-permanent adhesive, may be applied between the primary cover attachment section 68a and the first blade shell attachment section 80. The secondary cover attachment section 68b may be attached to the second blade shell attachment section 82 with the same means as described above. Alternatively, the secondary cover attachment section 68b may be fixedly attached to the second blade shell attachment section 82.

When the cover 62 is attached to the blade shell 26 or the blade shell 26 and the mould 50, the cover 62 may have the shape of a tent, a trough, a bellow or the like. The cover 62 may also be self-supporting when attached. The cover 62 may comprise an insulating material such as aluminium, e.g. in the inner surface of the cover 62 or on the outer surface of the cover 62.

Figure 7:
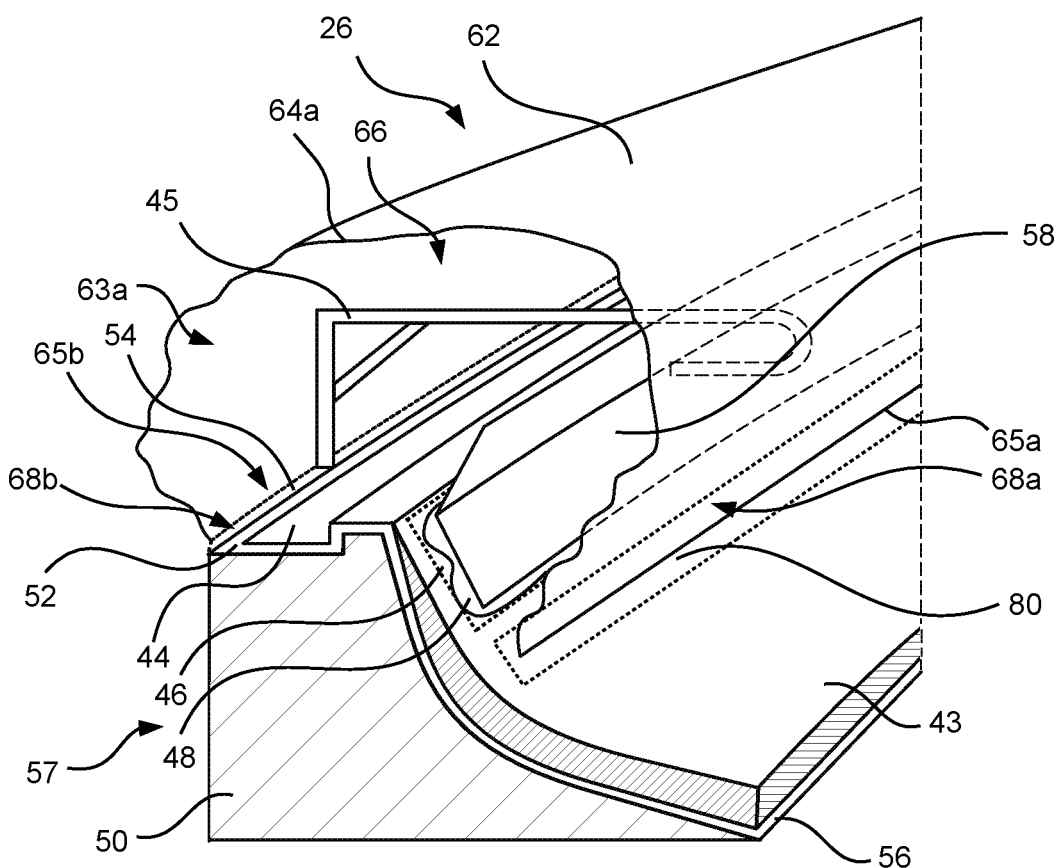
FIG. 7 is a schematic diagram illustrating an exemplary blade shell part with a cover.

FIG. 7 is an exemplary diagram illustrating a blade shell part 26, such as the blade shell part 26 of the previous figures. FIG. 7 illustrates part of the second blade shell part 26 in the mould 50. The mould 50 comprises a mould flange 52 which forms a blade shell flange 44. The inner surface 43 of the blade shell 26 comprises a fastening section 46 for attaching the support element 58. An adhesive 48 is applied between the fastening section 46 and the support element 58 for attachment. An optional clamping tool 45 may fixate the support element 58 in a desired position.

A cover 62 extends in a longitudinal direction between a first cover end 64a and a second cover end 64b (not shown) and extends in a transverse direction between a primary cover end 65a and a secondary cover end 65b. The cover comprises a first opening 63a and a second opening 63b (not shown). The cover 62 defines a cavity 66 wherein the support element 58 is arranged. The cover 62 comprises a primary cover attachment section 68a which extends along the primary cover end 65a and a secondary cover attachment section 68b which extends along the secondary cover end 65b. The secondary cover attachment section 68b is attached to a mould attachment section 54 of the mould 50 and illustrated in FIG. 7. The mould attachment section 54 may be located on the mould flange 52 or alternatively on the non-moulding side 57 of the mould. Alternatively, the secondary cover attachment section 68b may be attached to the inner surface 43 of the blade shell part, as illustrated in FIG. 6b. The primary cover attachment section 68a is attached to a first blade shell attachment section 80. The primary cover attachment section 68a and the secondary cover attachment section 68b may be attached by means of adhesive such as tape, hook and loop fasteners or other suitable means. Alternatively, the secondary cover attachment section 68b may be removably attached to the blade shell attachment section 68a, and the secondary cover attachment section 68b may be fixedly attached to the mould attachment section 54.

Figure 8:
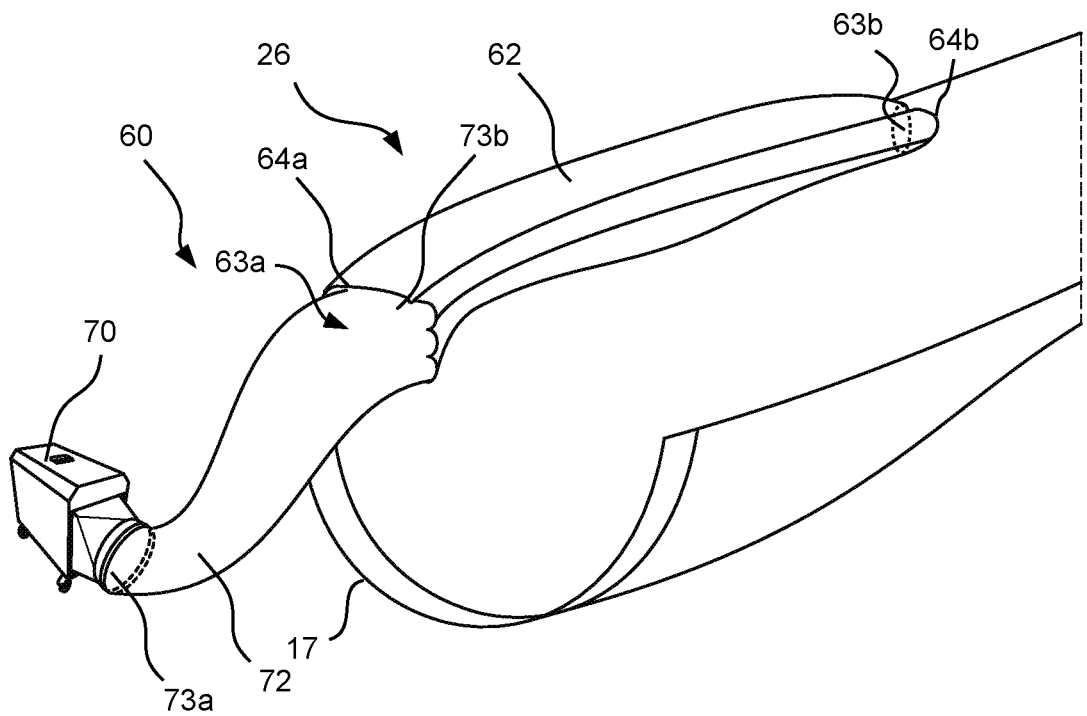
FIG. 8 is a schematic diagram illustrating an exemplary blade shell part with an air heating assembly.

FIG. 8 is a schematic diagram illustrating an exemplary blade shell part with an air heating assembly. For illustrative purposes, the mould is not illustrated. However, the blade shell part may be arranged in a mould, such as the mould 50 of the previous figures. The air heating assembly 60 comprises a cover 62, such as the cover 62 of the previous figures. The air heating assembly 60 further comprises a tube 72. The tube 72 comprises a first tube end 73a and a second tube end 73b. The second tube end 73b may be connected to the first opening 63a of the cover 62.

The first tube end 73a may be connected to an air heater 70 configured to provide heat. The air heater 70 may emit hot air, such as air with a temperature of between 50-80 degrees Celsius, such as between 60-75 degrees Celsius. The heat from the air heater 70 through the tube 72 into the cavity 66 of the cover 62, thus warming the air in the cavity 66. The tube 72 may extend in the longitudinal direction at least 5-10 m, such that the air heater 70 may be located in a safe distance from the adhesives in the cavity 66.

Heat may be provided for a first predetermined time. For example, heat may be provided for 10-15 minutes, e.g. until the temperature inside the cover stabilizes at around 60 degrees Celsius. When the temperature is stable, heat may be provided for a second predetermined time. For example, heat may be provided for around 30 minutes, e.g. until the adhesive reaches a Shore D hardness of 50. The Shore D hardness may be measured according to measurements under DIN ISO 7619-1. Heat may be provided for a total time of 30-50 minutes, such as 35-45 minutes, such as around 45 minutes, for the adhesive to cure. During this time, the heated air may be recirculated from the second opening to the air heater, e.g. by means of a second tube.

When the adhesive has cured, the cover 62 may be removed and the air heating assembly 60 may be removed.

Figure 9:
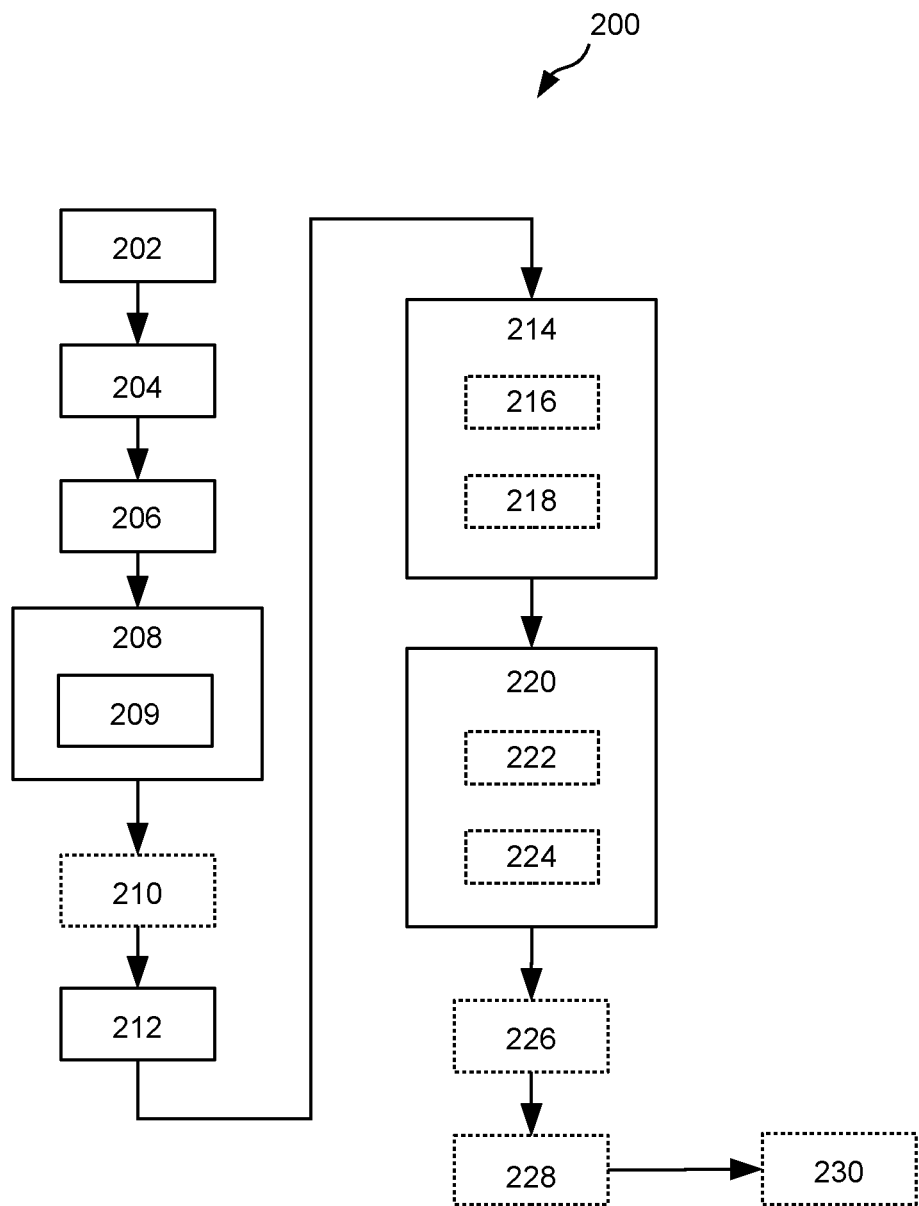
FIG. 9 is block diagram of an exemplary method.

FIG. 9 is a block diagram of an exemplary method 200 for manufacturing a blade shell part of a wind turbine blade, such as the blade shell part 26 of the previous figures.

The method 200 comprises providing 202 a mould for manufacturing a blade shell part, such as the mould 50 of FIG. 7. The mould has a first moulding side with a first moulding surface that defines an outer shape of the blade shell part.

The method 200 comprises providing 204 a blade shell part, such as a second blade shell part 26 of FIGS. 5-8, such as a suction side/downwind shell part. The blade shell part is provided on the first moulding surface.

The method 200 comprises providing 206 a support element, such as the support element 58, 58' of FIGS. 3-8.

The method 200 comprises attaching 208 the support element to the blade shell part, such as to the inner surface of the blade shell part. Attaching 208 the support element comprises applying 209 an adhesive between the support element and the fastening section of the blade shell part.

The method 200 may comprise fixating 210 the support element to the blade shell part with a clamping tool, such as the clamping tool 45 of FIG. 7, after attaching the support element to the blade shell part.

The method 200 comprises providing 212 an air heating assembly, such as the air heating assembly 60 of FIG. 8. The air heating assembly comprises a cover extending in a longitudinal direction between a first cover end and a second cover end and extending in a transverse direction between a primary cover end and a secondary cover end, the cover defining a cavity. The cover comprises a primary cover attachment section extending along the primary cover end and a secondary cover attachment section extending along the secondary cover end.

The air heating assembly comprises an air heater configured to provide heat and a tube comprising a first tube end and a second tube end, the tube being connected to the air heater at the first tube end and connected to a first opening of the cover at the second tube end.

The method 200 comprises attaching 214 the cover to the blade shell part or the blade shell part and the mould. Attaching 214 the cover may comprise attaching 216 the primary cover attachment section to a first blade shell attachment section of the blade shell part. Additionally, attaching 214 the cover may comprise attaching 218 the secondary cover attachment section to a mould attachment section of the mould or a second blade shell attachment section of the blade shell part.

The method 200 comprises providing 220 heat into the cavity by the air heater. Providing 220 heat may comprise providing 222 heat for a first predetermined time, e.g. until the temperature inside the cover stabilizes at around 60 degrees Celsius. Providing 220 heat may comprise providing 224 heat for a second predetermined time, e.g. until the adhesive reaches a Shore D hardness of 50.

The method 200 may comprise recirculating 226 the heated air from the second opening back to the air heater.

The method 200 may comprise removing 228 the air heating assembly.

The method 200 may comprise repeating 230 the method for another blade shell part, such as the blade shell part 24 of FIGS. 2-4.

LIST OF REFERENCES 2 wind turbine
4 tower
6 nacelle
8 hub
10 blade
12 blade part
14 blade tip
15 tip end
16 blade root
17 root end
18 leading edge
20 trailing edge
24 first blade shell part (pressure side, upwind)
25 leading part of pressure side
26 second blade shell part (suction side, downwind)
27 leading part of suction side
28 bond lines/glue joints
30 root region
32 transition region
34 airfoil region
38 chord
40 shoulder
42 shear web or spar side
43 inner surface
44 blade shell flange
45 clamping tool
46 fastening section
48 adhesive
50 mould
52 mould flange
54 mould attachment section
56 first moulding surface
57 non-moulding side
58 support element
58' support element
60 air heating assembly
62 cover
63a first opening
63b second opening
64a first cover end
64b second cover end
65a primary cover end
65b secondary cover end
66 cavity
68a primary cover attachment section
68b secondary cover attachment section
70 air heater
72 tube
73a first tube end
73b second tube end
74 first spar cap
76 second spar cap
80 first blade shell attachment section
82 second blade shell attachment section
90 first blade component
92 second blade component
100 first contact area
110 second contact area
200 method for manufacturing a blade shell part 202 providing mould
204 providing blade shell part
206 providing support element
208 attaching support element
209 applying adhesive
210 fixating support element
212 providing air heating assembly
214 attaching cover
216 attaching primary cover attachment section
218 attaching secondary cover attachment section
220 providing heat
222 providing heat for a first predetermined time
224 providing heat for a second predetermined time
226 recirculating air
228 removing air heating assembly
230 repeating for another blade shell part

The invention claimed is:

1. A method for manufacturing a blade shell part of a wind turbine blade, comprising:
providing a mould for manufacturing a blade shell part of the wind turbine blade, the mould having a first moulding side with a first moulding surface that defines an outer shape of the blade shell part;
providing the blade shell part on the first moulding surface,
providing a support element and attaching the support element to a fastening section of the blade shell part, wherein the support element is a trailing edge flange, and wherein the attaching of the support element comprises applying adhesive between the support element and the fastening section;
providing an air heating assembly, the air heating assembly comprising:
a cover extending in a longitudinal direction between a first cover end and a second cover end and extending in a transverse direction between a primary cover end and a secondary cover end, the cover defining a cavity, the cover comprising:
a primary cover attachment section extending along the primary cover end; and
a secondary cover attachment section extending along the secondary cover end;
an air heater configured to provide heat; and
a tube comprising a first tube end and a second tube end, the tube being connected to the air heater at the first tube end and connected to a first opening of the cover at the second tube end;
attaching the cover to the blade shell part or to both the blade shell part and the mould such that at least the fastening section is enclosed by the cover; and
providing heat into the cavity by the air heater.

2. The method according to claim 1, wherein the attaching of the cover to the blade shell part or to both the blade shell part and the mould comprises attaching the primary cover attachment section to a first blade shell attachment section of the blade shell part, and attaching the secondary cover attachment section to a mould attachment section of the mould or a second blade shell attachment section of the blade shell part.

3. The method according to claim 2, wherein the primary cover attachment section and the first blade shell attachment section comprise hook and loop fasteners.

4. The method according to claim 2, wherein the attaching of the cover to the blade shell part comprises attaching the primary cover attachment section and the blade shell part by means of an adhesive.

5. The method according to claim 1, wherein the cover of the air heating assembly comprises an insulating material.

6. The method according to claim 5, wherein the insulating material comprises aluminum foil.

7. The method according to claim 1, wherein the support element is a web.

8. The method according to claim 7, wherein the web comprises a shear web.

9. The method according to claim 1, wherein the air heater emits hot air.

10. The method according to claim 9, wherein the air heater emits air with a temperature of between 50°° C. and 80° C.

11. The method according to claim 1, further comprising providing heat for a first predetermined time.

12. The method according to claim 11, wherein the heat is provided until a temperature inside the cover stabilizes at 60° C.

13. The method according to claim 1, further comprising providing the heat for a second predetermined time.

14. The method according to claim 13, wherein the heat is provided until the adhesive reaches a Shore D hardness of 50.

15. The method according to claim 1, wherein the second cover end comprises a second opening and wherein the method further comprises recirculating heated air from the second opening back to the air heater.

16. The method according to claim 1, further comprising removing the air heating assembly.

17. The method according to claim 1, further comprising fixating the support element to the blade shell part with a clamping tool after attaching the support element to the blade shell part.

18. The method according to claim 1, wherein the tube extends in the longitudinal direction at least 5 m.

19. The method according to claim 1, wherein the adhesive applied between the support element and the blade shell part is made of vinyl ester.

20. The method according to claim 1, further comprising providing heat between 30-50 min for the adhesive to cure.

21. The method according to claim 1, wherein the cover has a shape of, or can be formed into the shape of, a tent, a trough, or a bellow.

22. The method according to claim 1, wherein the cover is self-supporting.

23. The method according to claim 1, wherein the blade shell part comprises a trailing edge formed as a flatback.

* * * * *